United States Patent Office 3,547,644
Patented Dec. 15, 1970

3,547,644
PHOTOGRAPHIC DRAFTING FILM WITH A POLYETHYLENE TEREPHTHALATE BASE CONTAINING SILICA
Jerome Albert Moede and Delmar Francis Schumacher, Rochester, N.Y., assignors to E. I. du Pont de Nemours and Company, Wilmington, Del., a corporation of Delaware
No Drawing. Filed Jan. 3, 1966, Ser. No. 517,894
Int. Cl. G03c 1/78
U.S. Cl. 96—87    4 Claims

ABSTRACT OF THE DISCLOSURE

Photographic drafting film comprising in order (1) a dimensionally stable polyester film base containing 0.5–10% by weight of silica particles with a $SiO_2$ content of 99.9%, a particle size of 1–5 microns and a surface area of 0.5–2.2 square meters per gram and at least one layer of (a) a reaction product made by polymerizing in the presence of gelatin vinylidene chloride, or methyl or ethyl acrylate and (b) a water-permeable colloid layer. The polyester base has excellent pencil receptivity and adequate gloss-transparency balance.

This invention relates to a photographic film having a drafting surface and a photographic layer.

Drafting film having a dimensionally stable polyester base and a drafting layer is described in Van Stappen U.S. Pat. 2,964,423. In this film the drafting layer has an urea-formaldehyde resin binder. The film is dimensionally stable and durable, and the drafting layer is extremely hard and waterproof. Such a drafting film requires careful coating of the matte or drafting layer, and non-uniform coating or erosion can result in loss of drafting surface spots or areas.

The novel photographic drafting film of this invention comprises, in order:
(1) A thin, flexible, dimensionally-stable, biaxially oriented film of a synthetic linear macromolecular ester polymer of a glycol having the formula $HO(CH_2)_nOH$ where $n$ is 2–10, or 1,4-cyclohexanedimethanol and terephalic acid or an ester-forming derivative thereof including a dimethyl or diethyl ester and from 0–35% by weight of a second dibasic carboxylic acid or ester-forming derivative, e.g., isophthalic, bibenzoic, sebacic, hexahydroterephthalic, adipic, azaleic, naphtholic, or 2,5-dimethylterephthalic acid or bis-p-carboxyphenoxyethane, said film being further characterized (a) by having uniformly dispersed therethrough 0.5 to 10% by weight, based on the polyester, of non-porous solid crystalline silica particles having a minimum $SiO_2$ content of 99.9%, by weight, an average particle size from 1 to 5 microns, and a surface area of 0.5 to 2.2 square meters per gram; (b) by having excellent pencil receptivity on each surface; and (c) by having an adequate gloss-transparency balance; and at least one of the layers:
(2) A thin layer of a reaction product made by polymerizing, in the presence of gelatin, at least one vinyl monomer selected from the group consisting of vinylidene chloride, methyl and ethyl acrylate wherein said constituents are present in the amount of 1–9 parts gelatin to 1 part, by weight, of the total monomer, or
(3) At least one water-permeable organic colloid layer.

At least one organic colloid layer should contain light-sensitive silver halide grains. The preferred polyester film is a polyethylene terephthalate film.

The photographic drafting films of the invention have the advantage that they retain their good pencil and ink receptivity before and after photographic processing, e.g., development and washing to remove the unexposed, undeveloped areas, and drying. An advantage of the gelatin-vinylidene chloride methyl or ethyl acrylate reaction product layer resides in the fact that the layer had good adherence to the matte polyester base and to an appertaining hardened water-permeable colloid both when wet or dry, and yet can be removed from the base by washing with an aqueous solution.

Any of the water-permeable colloid sublayers and/or water-permeable silver halide emulsion layers described in Cohen et al. U.S. Pat. 3,035,881 can be coated onto the gelatin-vinylidene chloride copolymer reaction product layer. However, gelatin-containing layers are preferred.

In a preferred manner of making the novel photographic drafting films, the matte-filled polyester surface is subjected to electrical discharge and then coated with a substratum comprised of a reaction product prepared by polymerizing, in the presence of gelatin, at least one vinyl monomer selected from the class consisting of vinylidene chloride, methyl acrylate and ethyl acrylate. At least one surfactant, preferably an amphoteric material such as N-coco-β-aminopropionate, cetyl or other long chain betaine, etc., is desirably present in the subbing formulation. This insures uniform coverage of the matte surface while the sublayer is being dried. Light-sensitive, gelatin-silver halide emulsion layers containing a gelatin hardening restrainer (to prevent hardening of the gelatin by exterior agents), an antihalation dye, stabilizer, wetting agents and various additives as conventionally used in photographic emulsions are applied over such a substratum and have good anchorage. In a particularly preferred embodiment, a gelatino-silver halide emulsion layer containing a tanning developing agent is applied over the above substratum in order to provide a wash-off film in which the gelatin is unhardened prior to imagewise exposure and development steps The invention is illustrated by, but is not limited to, the following examples wherein the parts stated are by weight:

EXAMPLE I

A matte-filled polyethylene terephthalate film (4 mils in thickness) was prepared in the manner described in Example I of assignee's U.S. patent application Ser. No. 485,079, now U.S. Pat. 3,382,206. Before heat relaxing the film, its surface was given an electrical discharge treatment by a Lepel Spark Generator, Model HFSG–2, after the manner described in Travers, U.S. Pat. No. 3,113,208. The film was then coated with a subbing composition comprised of materials listed below and dried at 170° F. and heat relaxed at 130° C. The composition coated uniformly and remained uniformly spread over the surface of the film throughout the drying period.

| Sub-composition, material: | Parts by weight |
|---|---|
| Water | 14,150 |
| Gelatin-polymer components [1] | 100 |
| Sodium salt of N-coco [2]-β-amino-propionate | 4.3 |
| Isooctyl phenoxy polyethoxy ethanol (containing 9–10 ethoxy groups) | 15 |
| Silica hydrosol (30% $SiO_2$), having silica particle approximately 15 millicrons diameter in size | 170 |

[1] The Gelatin-Polymer component was prepared by copolymerizing 18 parts of vinylidene chloride and 7 parts of methyl acrylate in the presence of 75 parts of gelatin. The polymerization was carried out in aqueous medium in the presence of a redox catalyst system, e.g., a mixture of ammonium persulfate and sodium metabisulfite, and an anionic surfactant, e.g., sodium lauryl sulfate.
[2] The coco designation represents a mixture of the high molecular weight hydrocarbon radicals corresponding to those present in the esters in the coconut oil including, in order of decreasing concentration, lauryl, myristyl, palmityl, caprylyl, capryl and oleyl.

The subbed layer was then coated with a gelatino-silver chloride emulsion containing a tanning developing agent, a gelatin hardening restrainer to prevent hardening of the gelatin by exterior agents, an antihalation dye, fog stabilizer, wetting agents and various other additives as conventionally used in photographic emulsions. The element was given an imagewise exposure to a carbon arc lamp and then developed for 1 minute at 68° F. in an aqueous solution comprising 5% by weight sodium carbonate. The emulsion was tanned (hardened) in the image area: the non-image emulsion remained unhardened and it and the sublayer were washed off in warm water leaving behind a relief image on the polyester support.

Good adhesion was obtained between all layers before and after exposure and photographic processing of the element. Neither matte-filled polyester drafting film nor the substratum contributed to the hardness of the emulsion layer. The drafting characteristics of the washed off area were like those of the uncoated matte-filled polyester film.

EXAMPLE II

Matte-filled polyester film was prepared and subbed in the manner described in Example I. The subbed surface was then coated with a direct-positive type gelatino-silver halide emulsion which contained a desensitizing dye and various other additives as conventionally used in photographic emulsions. The element was then given an imagewise exposure and developed in the conventional manner.

Good adhesion was obtained between all layers before and after exposure and photographic processing of the element. The matte-filled polyester film did not adversely affect the photographic properties of the emulsion.

EXAMPLE III

A matte-filled polyester film was prepared and treated with electrical discharge in the manner described in Example I, except no substratum was used. The film base was then coated with a conventional gelatino-silver chloride emulsion as described in Example I, and similarly given an imagewise exposure and then developed.

Good adhesion was obtained between all layers before and after exposure and processing of the photographic element.

The photographic drafting films of this invention can be made from any of the matte-polyester films described in assignee's U.S. application Ser. No. 485,079, filed Sept. 3, 1965, now U.S. Pat. 3,382,206. The photographic layer may be any conventional gelatino-silver halide emulsion. A conventional substratum may or may not be applied. The emulsion can contain known antifoggants, e.g., 6-nitrobenzimidazole, benzotriazole, triazaindenes, etc., as well as the usual hardeners, i.e., chrome alum, formaldehyde, dimethylol urea, mucochloric acid, etc. Other emulsion adjuvants that may be added comprise plasticizers, toners, optical brightening agents, etc.

The polyester surface can be treated to enhance adhesion by methods other than electrical discharge, e.g., flame treatment; or by treating it with sodium hydroxide; chromic acid in sulfuric acid; and oxygen or ozone in the presence of ultraviolet light.

The photographic product of the present invention is especially useful for graphic art, drafting, and cartographic applications. The product of this structure is useful in that it provides a durable water-resistant matte surface under the photographic layer. Thus, where the layer is removed, a matte surface remains as a drafting surface. By reason of the fact that the drafting surface is the surface of the polyester film itself, it is as durable as the film itself, no loss of the drafting surface through loss of a matte coating can result. Also, the drafting film is far less susceptible than conventional drafting films to developing opaque kink marks when the film is wrinkled or folded.

The embodiments of the invention in which an exclusive property or privilege is claimed are defined as follows:

1. A photographic drafting film which comprises, in order:
(1) a thin, flexible, dimensionally-stable, biaxially oriented film of a synthetic linear macromolecular ester polymer of a glycol having the formula $$HO(CH_2)_nOH$$

where $n$ is 2–10, or 1,4-cyclohexanedimethanol and terephthalic acid or an ester-forming derivative thereof, including a dimethyl or diethyl ester and from 0–35% by weight of a second dibasic carboxylic acid or ester-forming derivative, including isophthalic, bibenzoic, sebacic, hexahydroterephthalic, adipic, azaleic, naphtholic, or 2,5-dimethylterephthalic acid or bis-p-carboxylphenoxyethane, the said surface of said film being modified by electrical discharge treatment and further characterized (a) by having uniformly dispersed therethrough 0.5 to 10% by weight, based on the polyester, of nonporous solid crystalline silica particles having a minimum $SiO_2$ content of 99.9%, by weight, an average particle size from 1 to 5 microns, and a surface area of 0.5 to 2.2 square meters per gram; (b) by having excellent pencil receptivity on each surface; and (c) by having an adequate gloss-transparency balance; and at least one of the layers:
(2) a thin layer of a reaction product made by polymerizing, in the presence of gelatin, at least one vinyl monomer selected from the group consisting of vinylidene chloride, methyl and ethyl acrylate, wherein said constituents are present in the amount of 1–9 parts gelatin to 1 part, by weight, of the total vinyl monomer; or
(3) at least one water-permeable organic colloid layer.

2. A film according to claim 1 wherein said ester polymer is polyethylene terephthalate.

3. A film according to claim 2 wherein the organic colloid is gelatin.

4. A film according to claim 2 having a gelatin sublayer and a gelatino-silver halide emulsion layer.

References Cited

UNITED STATES PATENTS

| | | | |
|---|---|---|---|
| 3,201,506 | 8/1965 | Bills | 264—210 |
| 3,340,062 | 9/1967 | Hunter et al. | 96—84 |
| 3,353,958 | 11/1967 | Moede | 96—87 |
| 3,113,208 | 12/1963 | Traver | 250—49.5 |
| 3,220,842 | 11/1965 | Carroll et al. | 96—87 |
| 3,382,206 | 5/1968 | Karickhoff | 260—40 |

FOREIGN PATENTS

| | | |
|---|---|---|
| 1,347,696 | 11/1963 | France. |

NORMAN G. TORCHIN, Primary Examiner

J. R. HIGHTOWER, Assistant Examiner